United States Patent [19]
Bachle

[11] 3,748,836
[45] July 31, 1973

[54] FILTER CLEANING SYSTEM FOR INTERNAL COMBUSTION ENGINE

[75] Inventor: Carl F. Bachle, Grosse Pointe Farms, Mich.

[73] Assignee: Teledyne Industries, Inc., Los Angeles, Calif.

[22] Filed: June 3, 1971

[21] Appl. No.: 149,634

[52] U.S. Cl. .................... 55/302, 55/342, 55/431, 251/61.1
[51] Int. Cl. ........................................... B01d 46/04
[58] Field of Search ................ 55/96.283, 302, 342, 55/431; 123/DIG. 11; 251/61.1

[56] References Cited
UNITED STATES PATENTS

| | | | |
|---|---|---|---|
| 1,784,278 | 12/1930 | Dollinger | 55/96 |
| 2,368,787 | 2/1945 | Skinner | 55/283 |
| 2,537,094 | 1/1951 | Schmidlin | 55/302 |
| 3,165,390 | 1/1965 | Parken et al. | 55/431 |
| 3,332,217 | 7/1967 | Rymer | 55/302 |
| 3,540,193 | 11/1970 | Pausch | 55/283 |

*Primary Examiner*—Bernard Nozick
*Attorney*—Hauke, Gifford & Patalidis

[57] ABSTRACT

An engine combustion air filter cleaning system which includes a means for storing pressurized air in a storage chamber during each high power operation of the engine. During each subsequent idling operation, there is provided an explosive release of the previously stored pressurized air to provide a reverse air flow path through the filter and to remove adherent particles from the filter element. Provision is also made for the continuous removal of dislodged particles by a back flow of pressurized air from the engine manifold.

6 Claims, 3 Drawing Figures

INVENTOR
CARL F. BACHLE

BY Hauke, Gifford & Patalidis
ATTORNEYS

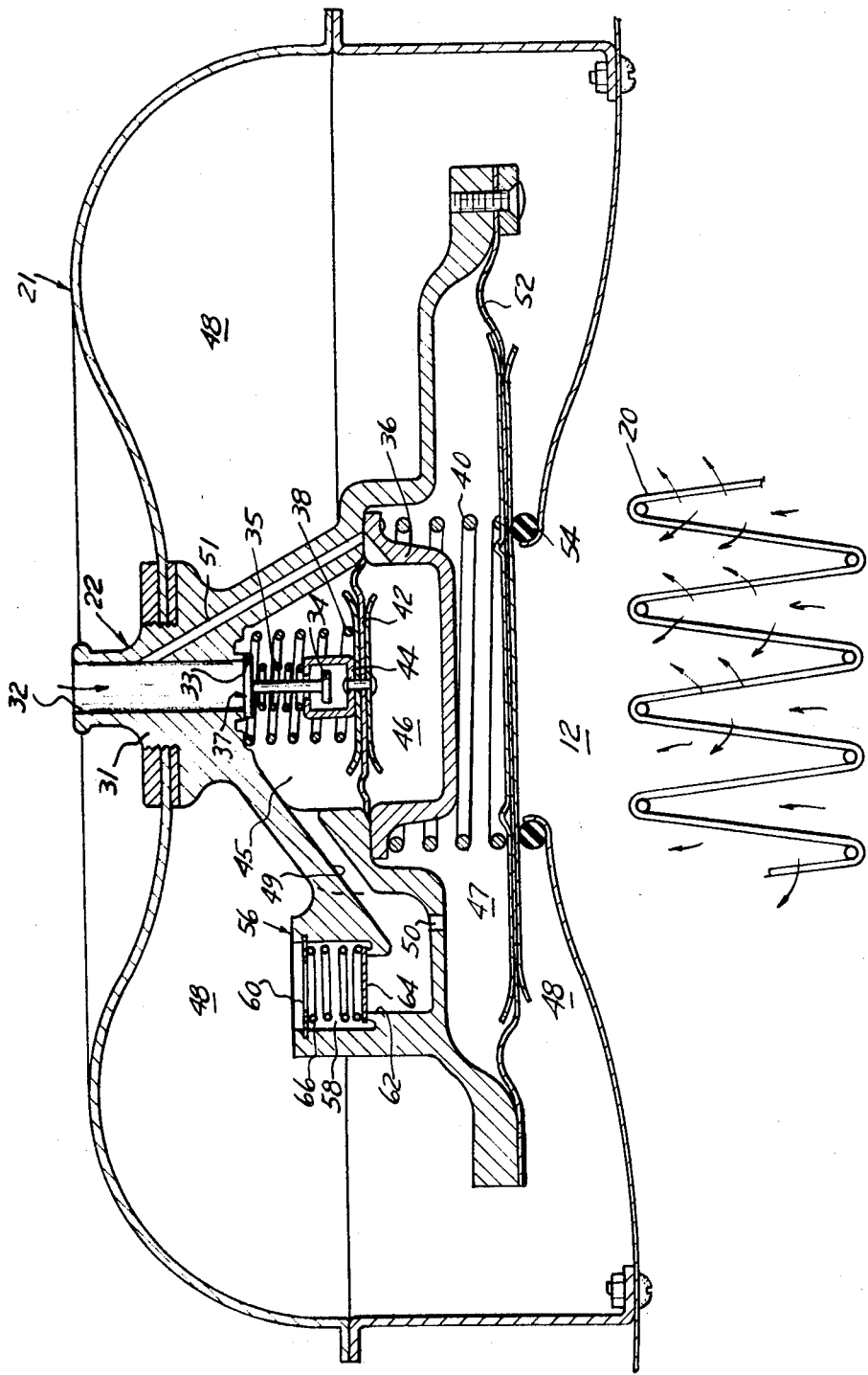

FILTER CLEANING SYSTEM FOR INTERNAL COMBUSTION ENGINE

BACKGROUND OF THE INVENTION

Commonly, servicing of air filters for internal combustion engines is accomplished by hand removal of a paper filter element which is then discarded and replaced. Other systems use a cloth filter element which must be hand removed and cleaned by hand and then reinstalled. In most cases, these systems are used until a build-up of pressure drop across the filter element is excessive, which build-up occurs from gradual clogging of the filter element with dirt or other foreign entrained particles.

The present invention provides a self-cleaning filter system in which there is provided a build-up of pressurized air in a storage chamber with a valve system to provide the required reverse flow through the filter chamber automatically. The system as described is intended for turbosupercharged engines and the stored pressure air is derived from the turbosupercharger feedback of intake manifold pressure during each high power operation of the engine. It is apparent, however, that with modifications the system could be used as well on engines without turbosuperchargers where the stored high pressure air would be derived from a special air compressor or, if the engine is used on a vehicle, the air could be taken from the compressed air brake system commonly provided on at least larger vehicles.

The valve structure is such that when the engine is returned to idling operation and the manifold pressure drops, an explosive reverse direction flow of the previously stored pressurized air through the filter chamber will be initiated. This mode of operation does not permit any substantial buildup of particles on the filter element itself. The intake manifold pressure is further used to aspirate the particles previously dislodged from the filter and deposited by gravity into a collecting vessel or chamber at the lower end of the filter chamber itself, thus virtually eliminating the need for periodic servicing and greatly extending the time between required attention to the filter element.

BRIEF DESCRIPTION OF THE DRAWINGS

The following is a brief description of the drawings of the preferred embodiment of the invention in which like numerals and letters are used to refer to like parts as they may appear throughout the several Figures:

FIG. 3 is a detailed, cross-sectional view of the valve and air storage chamber, with parts broken away. Also included is a showing of the filter element.

DETAILED DESCRIPTION OF THE DRAWINGS

Figure 1:
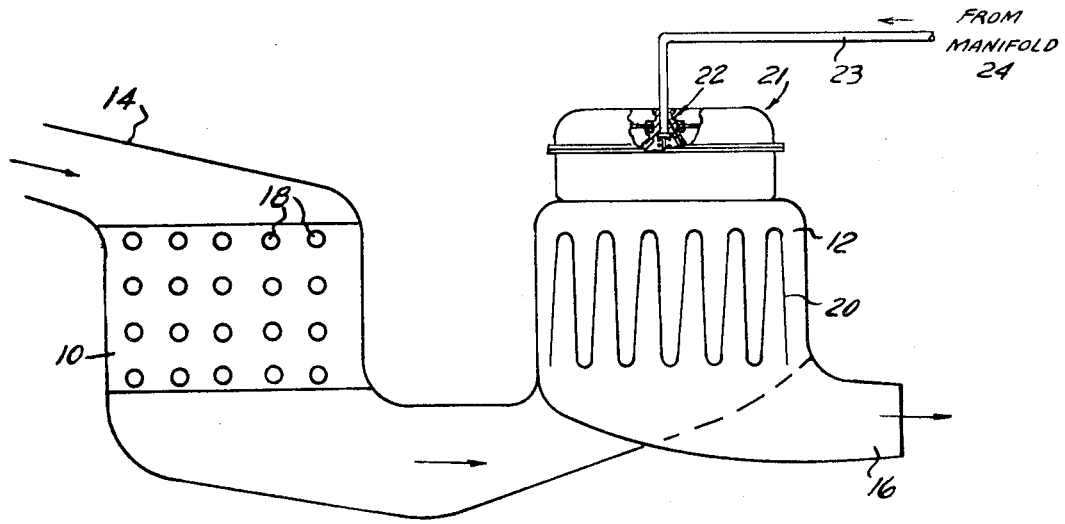
FIG. 1 is a partly diagrammatic, top plan view of the filter system according to the invention showing the prefilter and main filter stages as they are positioned relative to the compressor and air intake manifold.
Figure 2:
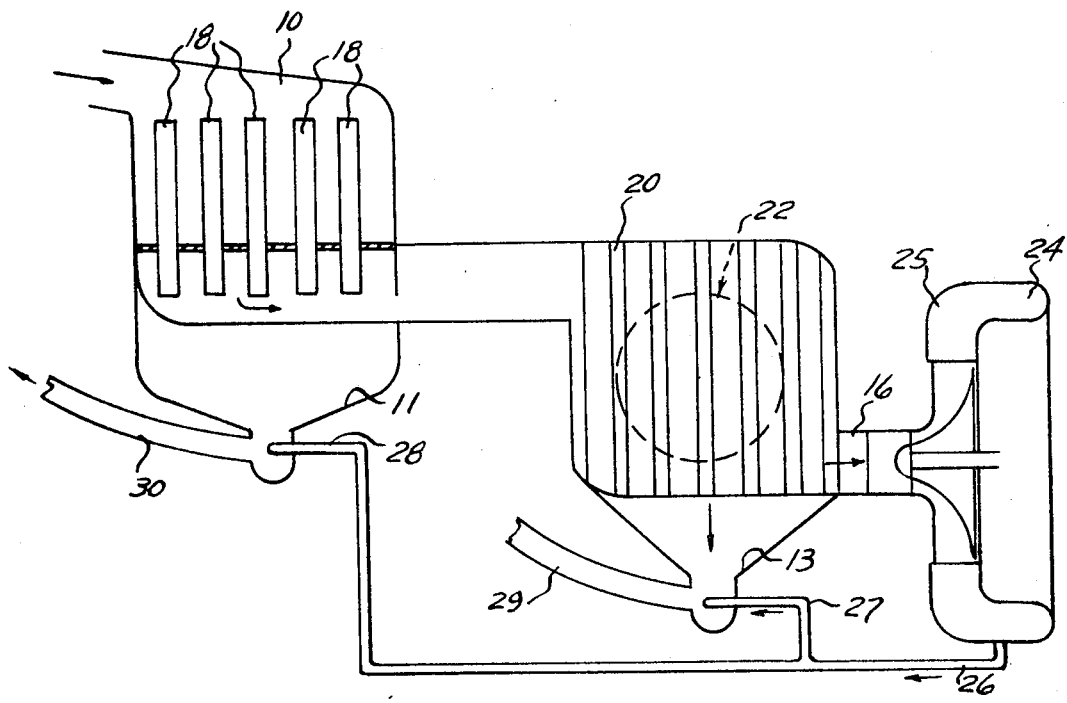
FIG. 2 is a partly diagrammatic, side elevational view of the filter system of FIG. 1 showing its cooperative relationship to the following compressor and manifold stages.

FIG. 1 shows the filter system according to the invention, which system includes a pre-filter chamber 10 and a final filter chamber 12. While these are normally contained within a single housing, they have been separated and shown in separate housings in the drawings for the sake of clarity. The two air filter chambers are incorporated in the system with the flow path of air as it is taken through the filter indicated by the arrows. The intake end of the filter stages is identified by the numeral 14, while the right hand output end 16 is coupled to the following compressor and manifold stages as is better shown in FIG. 2. Included in the pre-filter chamber 10 are a plurality of relatively widely spaced, coarse cleaning elements 18 which are arrayed in the manner shown and these separate dirt from the air by centrifugal action as is well known in the art. The structure of the coarse cleaning elements 18 has not been shown in detail in the drawings since there are many ways to provide such elements all well known in the art and the construction forms no part of the present invention. The change in direction of the air as it flows through the filters 18 and again as it is directed toward the final filter chamber 12 causes at least some of the dirt to drop into the hopper 10. The line beneath the cleaning elements 18 in FIG. 2 is not intended to denote a separation of the elements 18 from the hopper 11 but is intended to show means for directing the air toward the final filter chamber 12. Included in the final filter chamber 12 is a filter element 20 which is retained in the filter compartment in a pleated form to increase its effective filter surface. The filter element 20 may be mounted in the housing in any well known manner. It will be understood that the filter element 20 may be made of any porous material having small openings for air passage, such as cloth, metal or fiber, adapted to provide an efficient cleaning and filtering action.

Also shown at the side of the final filter chamber 12 is a pressurized air storage chamber housing member 21 and an associated valve 22, carried in the housing member 21 both of which are indicated in diagrammatic form. The detail of the construction of these two last-mentioned elements will be shown and explained in connection with FIG. 3 hereinafter. Also shown in FIG. 1 is a conduit 23 for providing a pressurized air input to the valve 22 from the intake air manifold 24 (FIG. 2) preferably at a point adjacent the intake valve port (not shown) of the engine. The pressurized air input for the valve 22 is normally of the order of two to four atmospheres of pressure.

FIG. 2 shows the manner in which the filter elements 18 and 20 are arranged in the two filter chambers 10 and 12, respectively. Also indicated in dash line form is the valve 22 as it is positioned at the side of the filter chamber 12. As shown in diagrammatic form, the turbocharger system comprises the manifold 24 and the compressor 25; the feedback system of pressurized air is provided from the manifold 24 through a conduit 26. The intake manifold 24 is connected to the intake valve ports (not shown) of the engine in the conventional manner. The conduit 26 has a pair of branch conduits 27 and 28 extending laterally from it for the purpose of providing an aspirating air flow through both of the respective lower collecting chambers 11 and 13 of the two filter chambers 10 and 12. Although not clearly shown in the drawings the filter element 2 is arranged in the filter chamber 20 such that at least some of the dirt collected by it from the air passing through filter element 20 will fall by gravity into the collecting chamber. The lower collecting chamber 13 of filter chamber 12 receives the end of the conduit 27 and further includes an exhaust conduit 29. There is a continuous flow through conduit 29 of particles previously dislodged from the filter element 20. In a like manner, pressurized air flow from the conduit 28 provides aspirator air for the removal of particles from the lower end of the collector chamber 11 and continuously exhausts them through the conduit 30.

FIG. 3 shows the internal structure of the valve 22 and of the pressurized air storage chamber housing member 21. The valve 22 includes a central body 31, an inlet passage 32, an upper valve seat 33, and a valve member 37 located in the body 31 having a triggering extension 34. A closing spring 35, mounted between the triggering extension 34 and a spring seat 44, provides a closing force to the lower surface of the triggering extension 34 to force the valve member 37 upwardly or against the valve seat 33 to its normally closed position. The spring 35 exerts a closing force in proportion to the position of the spring seat 44. The valve 22 further includes a diaphragm 42, mounted to the lower end of the spring seat 44 and dividing a chamber connected with the inlet passage 32 into an upper portion 45 and a lower portion 46. A spring 38 normally maintains the diaphragm 42 in the position shown. It will be seen that the chamber 46 provides a time delay stage for the operation of the valve 22. The valve 22 and the pressurized air storage chamber housing member 21 will be seen to provide two separate chambers 47 and 48, respectively. Valve passages 49 and 50 are shown communicating between the upper chamber 45 and the lower storage chamber 47. A bleed passage 51 is shown communicating between the chamber 46 and the inlet passage 32. Connected at the lower end of chamber 47 is a diaphragm 52 which is maintained in a normally closed position against an O-ring 54 by a spring 40.

Shown retained in the filter chamber 12 is the filter element 20, which is preferably of cloth-like material, and which is loosely mounted around pin member 21 in a manner to permit vibrational or flapping movement of the cloth filter element 20. The passage of air carrying entrained dirt or other foreign particles is in the general direction indicated by the several arrows. The diaphragm 52 is positioned across the filter element 20 the manner illustrated diagrammatically in FIG. 3 in such as to provide for a sudden on-rush or explosive discharge of the air from the pressurized air storage chamber 48 in a direction reverse to that of the arrows through the filter element 20 in response to operation of the valve 22, as will be more fully explained in the description of operation hereinafter. The valve body 31 further has connected at its left hand side a separate valve 56. The valve 56 includes a chamber 58, an outlet 60 and an inlet valve seat 62 engageable with a normally closed valve closure member 64. A coil spring 66 is mounted in the manner shown to maintain the valve 56 in its normally closed position.

DESCRIPTION OF OPERATION

During the operation of the engine, air under pressure passes through the filters 10 and 12 in the general path indicated by the arrows in FIGS. 1 and 2. As is shown further in FIG. 2, the outlet from the filter 12 communicates with the compressor 25 and thence to the manifold 24. During high power operation of the engine, as would occur upon acceleration of the engine under load for instance, intake manifold air is passing in the direction shown, and air from the manifold 24 passes through conduit 23 (FIG. 1) and is is trapped in pressure the storage chamber housing 21 through the operation of the valve 22 and its associated elements. With more specific reference to FIGS. 1 and 3, the pressurized air from the mainfold 24 enters the inlet passage 32 of the valve 22 through conduit 23 and opens the valve member 37 to flow into the upper chamber 45 and through the passages 49 and 50 into the lower storage chamber 47. Pressurized air also fills the chamber 46 through passage 51. At the same time, the valve 56 is opened through the upward movement of valve operator 64 to provide flow of pressurized air to the main storage chamber indicated by the numeral 48.

When the engine changes over from high power to idling operation manifold pressure is reduced and is not sufficient to overcome the spring 35 so that, pressurized air no longer passes through the valve 22. The pressure of the air in chamber 46 greater than that at inlet passage 32 and is lost through the bleed passage 51 to inlet passage 32, while pressure will remain trapped in chamber 48 by the closed valve 64 and the closed diaphragm 52. When the pressure in the lower chamber 46 reaches the pressure of inlet 32, the diaphragm 42 will be moved downwardly by the spring 38 so that the seat 44 will engage the triggering extension 34 of the valve member 37, causing the valve member 37 to move to an open position. This opens the chamber 45 to the lower pressure at inlet passage 32 and thus relieves the pressure in chamber 47 through the passages 50 and 49, the upper chamber 45 and past the open valve member 37. Relieving pressure from chamber 47 permits the pressurized air in chamber 48 beneath the diaphragm 52 to move the diaphragm 52 upwardly away from the O-ring 54. The air in chamber 48 is then explosively released past the O-ring 54 and into the chamber 12 in which the filter elemen 20 is mounted.

As is shown in FIG. 3, the normal flow of pressurized air through the filter chamber 12 is such that the dust or other foreign particles will have been collected along the inlet side of the filter material. Upon the sudden release of the diaphragm 52 from its sealing engagement, the pressure wave discharge of the previously confined air in the chamber 48 is in a reverse flow direction to that indicated by the arrows so that the adherent particles are dislodged from the filter element 20. The momentary reverse flow of air further causes the cloth-like filter element 20 to flex outwardly to assist in dislodging the dirt particles. With reference to FIG. 2, the particles then drop to the lower collecting end 13 of the chamber 12. The constant flow of pressurized air provided by the conduits 26 and 27 when the engine is at high power removes these particles through the exhaust conduit 29. With respect to the pre-cleaner 10, a like arrangement is shown for exhausting the particles from the filter elements 18 through the conduit 28 and the exhaust conduit 30.

It is apparent that the triggering extension 34 of the valve member 37 and its associated parts operate as a time delayed servo-mechanism for operating the diaphragm 52. The chamber 46 and its effect upon the triggering extension 34, through the diaphragm 42 and the member 44, produces the time delay necessary to assure that the filter element 20 will not be cleaned each time there is a momentary reduction in engine power. Once the valve member 37 has been opened by the diaphragm 42, the effect on the diaphragm 52 is quite fast to produce the necessary sudden surge of air into the filter chamber 12 from the stored air in chamber 48.

It will thus be seen that I have provided by my invention an automatic filter cleaning system in which a cleaning cycle of the filter element itself is provided each time the engine operation undergoes a changeover from high power to idling operation. With this mode of operation, it is possible to prolong indefinitely the life of the filter element since excessive clogging of the screen is never permitted to occur. The additional provision for continuous removal of the particles collected from the filter system itself constitutes a still further advance over the prior art.

I claim:

1. A filter cleaning system for an internal combustion engine having an intake manifold and means increasing the pressure of air at the intake manifold during high operation of the engine and for reducing the pressure at the intake manifold during idling operation of the engine said filter cleaning system comprising, a housing having a filter element therein and means directing air flow through said filter element in a first normal direction, means for periodically directing a blast of air through said filter element in a second direction reverse to the first normal direction of air flow through said filter element to thereby dislodge accumulated dirt from said filter element, said last mentioned means comprising a storage member and valve means connecting said storage member to the intake manifold of said engine to deliver pressurized air through said valve means to said storage member, said valve means including a valve element being spring biased to a closed position whereby the pressure of the air delivered from said intake manifold is not sufficient to open said valve element during idling operation of said engine, a normally closed diaphragm member disposed intermediate said storage member and a port of the housing containing said filter element normally closing said port, means for moving said diaphragm to open said port upon said engine assuming idling operation, said means comprises said diaphragm being subjected to substantially equal forces on each side thereof during high operation of said engine and means for relieving pressure on one side of said diaphragm during idling operation of said engine.

2. The filter cleaning system as defined in claim 1 and in which said valve means is operable to open to relieve pressure on said one side of said diaphragm after a predetermined time delay.

3. The combination as set forth in claim 1 wherein a collecting chamber is included at the lower end of said filter housing, and wherein a means is included for providing air flow through said collecting chamber to exhaust said particles therefrom.

4. The combination as set forth in claim 1 wherein a collecting chamber is included at the lower end of said filter housing for collecting the particles removed from said filter element, and means for removing said particles from said collecting chamber.

5. The combination as set forth in claim 1 wherein said last mentioned means comprises a bleed-off conduit connected between said manifold and said collecting chamber for continuously providing said further pressurized air flow to exhaust said particles.

6. The filter cleaning system as defined in claim 1 and in which said valve means comprises a spring biased valve member normally closing flow from said intake manifold to said storage member and being opened only when a predetrmined pressure has been produced at said intake manifold; a second means for opening said valve to relieve pressure on said one side of said diaphragm after a predetermined time delay after said engine has begun to operate at idle, said last mentioned means comprising a pressure responsive member operable upon sensing a pressure differential between the pressure of the air stored in said storage member and the pressure of the air at said intake manifold to open said valve member.

* * * * *

UNITED STATES PATENT OFFICE
CERTIFICATE OF CORRECTION

Patent No. 3,748,836     Dated July 31, 1973

Inventor(s)   Carl F. Bachle

It is certified that error appears in the above-identified patent and that said Letters Patent are hereby corrected as shown below:

Col. 2, line 60, delete "element 2" and insert --element 20--;

Col. 3, line 37, delete "members" and insert --members--;
line 43, after "20", insert --in--;
line 44, after "FIG. 3", delete "in".

Col. 4, line 1, delete the first word "pressure", and insert --pressure-- after the second word "the";

line 36, delete "elemen" and insert --element--.

Signed and sealed this 26th day of February 1974.

(SEAL)
Attest:

EDWARD M. FLETCHER, JR.
Attesting Officer

C. MARSHALL DANN
Commissioner of Patents